Dec. 30, 1924.

O. WALKER

PRESSING IRON

Filed Aug. 4, 1922

O. WALKER

PRESSING IRON

Filed Aug. 4, 1922

Patented Dec. 30, 1924.

1,521,058

UNITED STATES PATENT OFFICE.

OTTO WALKER, OF ZURICH, SWITZERLAND, ASSIGNOR TO JEAN BÄR, OF DOZWIL, SWITZERLAND.

PRESSING IRON.

REISSUED

Application filed August 4, 1922. Serial No. 579,691.

*To all whom it may concern:*

Be it known that I, OTTO WALKER, a citizen of the Swiss Confederation, and residing at Zurich, Bleicherweg No. 28, Switzerland, have invented certain new and useful Improvements in Pressing Irons, of which the following is a specification.

The present invention relates to a new and improved flat or pressing iron and has for its main object the production of an electrically heated iron provided with means for generating steam and for supplying steam to the fabric which is being pressed.

Another object of the invention is to provide a flat iron of the class described which shall be simple, strong and compact and adapted to yield the highest desirable results in operation.

Other objects of the invention relate to the provision of minor parts and to details of construction all of which will be more clearly set forth in the annexed specification.

With the above objects in view the invention resides in the parts and combinations of parts hereinafter described and particularly set forth in the appended claim.

In order that my invention may be clearly understood I have illustrated the same in the accompanying drawings, wherein—

Figure 1:
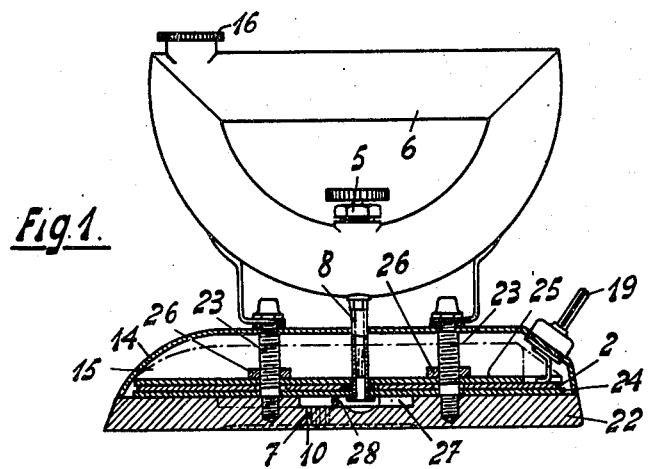
Fig. 1 shows an electrically heated flat iron in side elevation, parts being shown in section.
Figure 2:
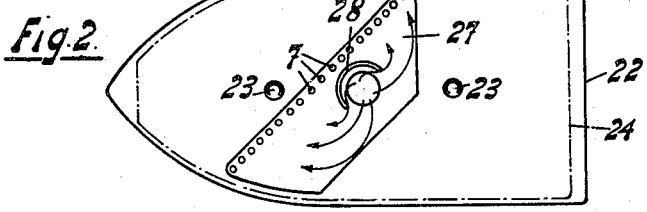
Fig. 2 is a plan view of the bottom or operating plate of the iron.

The iron shown in Figs. 1 and 2 comprises a bottom plate 22 into which two screw threaded bolts 23 are screwed. On the bottom plate 22 rests a sheet metal plate 24, and on said plate 24 an electric heating element 2 is arranged. The heating element 2 is held in position by a plate 25 and by nuts 26 screwed on said bolts 23. Above the bottom plate 22 a cover 14 is arranged which is firmly held by nuts on the bolts 23. A hollow handle 6 is fastened to the bolts 23. Said handle is adapted to receive the water to be vaporized. The handle 6 is provided with a filling-in screw 16 and with an adjustable needle valve 5 by means of which water passes from the handle 6 to a tube 8 in predetermined quantities according to the setting of the valve 5. The tube 8 passes across the plates 24, 25 and the electric heating element 2. The joints are rendered tight by soldering to prevent the access of water and steam to the element 2. The tube 8 ends above a recess 27 of the plate 22. From the said recess 27 bores 7 pass to the lower face of the bottom plate 22. The bores 7 are arranged at regular distances apart in a line at an angle to the centre line of the operative face of the iron. The bores 7 end in a groove 10 by means of which the steam issuing from the nozzles 7 is equally distributed. Between the lower end of tube 8 and the bores 7 a semi-circular ridge 28 is provided which prevents water from reaching the bores 7 before evaporation has taken place. As indicated by dotted lines a backing body 15 may be arranged on the plate 25. The electric heating element 2 is electrically connected to the studs 19 by well known means. The studs 19 are insulated and are adapted to receive a plug of known construction.

In operation the needle valve 5 is opened after the electric heating element has been connected to the current supply. The water passing into recess 27 is vaporized and the steam generated escapes through the bores 7 on to the fabric over which the iron is moved to and fro, the amount of steam applied being regulated by the needle valve 5.

Figure 3:
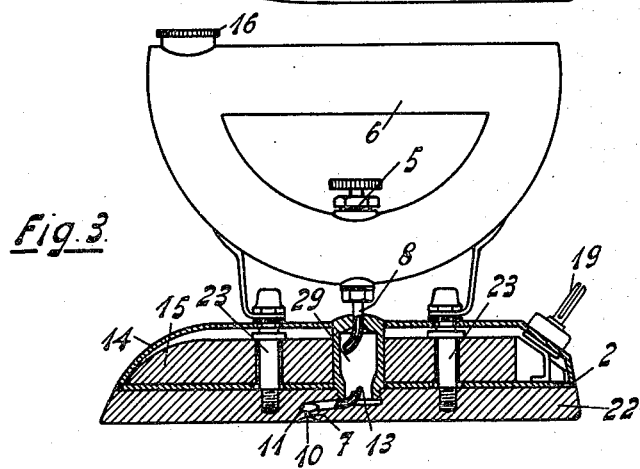
Fig. 3 shows a second form of construction of the flat iron in a side elevation and Fig. 4 shows the lower face of the bottom plate.
Figure 4:
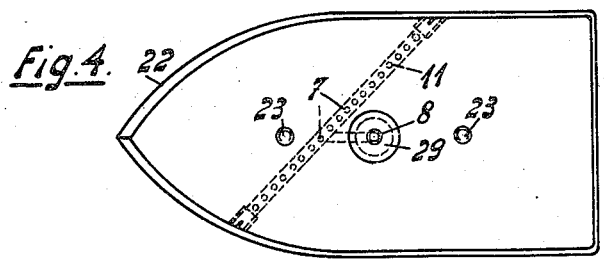

In the construction shown in Figs. 3 and 4 the tube 8 ends in a chamber 29 screwed into the bottom plate 22. From the chamber 29 in which the water is evaporated a tube 13 passes to a bore 11 and from the bore 11 a number of nozzles 7 lead to a groove 10 in the working face of the plate 22. On the heating element 2 rests a backing body 15 which is firmly held by the bolts 23, on which the cover 14 and the handle 6 are fastened. The handle 6 which is a water container is provided with a needle valve 5 by means of which the flow of water and the steam produced may be regulated.

Figure 5:
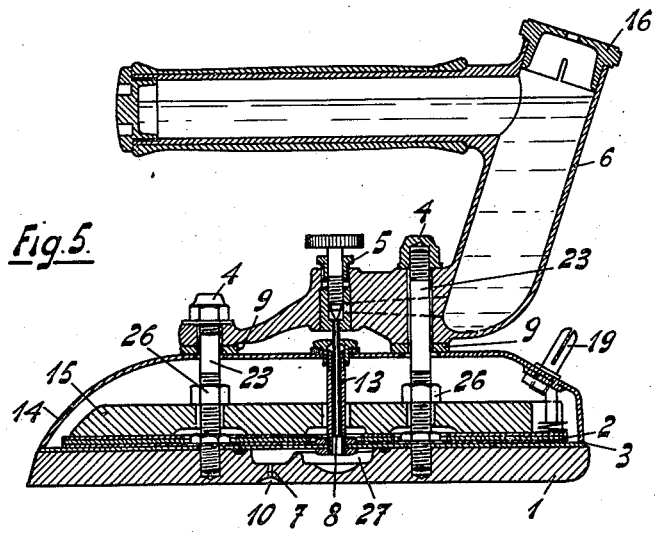
Fig. 5 is a sectional elevation of a third form of construction.
Figure 6:
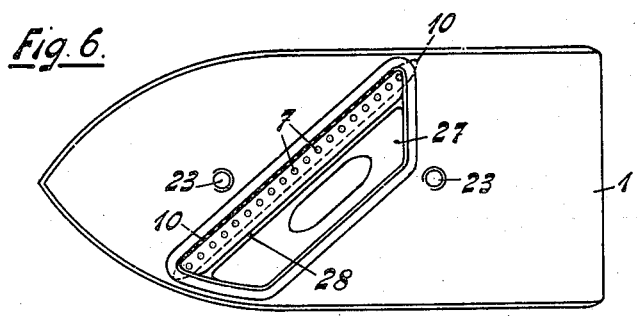
Fig. 6 shows the bottom plate from above.

The flat iron as shown in Figs. 5 and 6 comprises a bottom plate 1 on which a layer of insulating material 3 is placed. On the electric heating element 2 resting on said layer 3 a backing body 15 is arranged which is screwed down by nuts 26 on bolts 23. On the bolts 23 a cover 14 and a handle 6 are fastened by means of nuts 4. Heat insulating washers 9 are arranged between the cover 14 and the handle 6. The handle 6 forms a water container, and is provided with a filling-in screw 16 and with a needle valve 5 by means of which water from the handle 6 is fed to a tube 8 arranged within a larger tube 13. The latter is tightly fastened to the cover 14 and to the plate 3 and leads the water to a recess 27 in the top of the plate 1. From the recess 27 a row of holes 7 lead to a groove 10 in the lower face of the plate 1. Between the holes 7 and the lower aperture of tube 13 a ridge 28 is provided which retains the water issuing from the tube 13 in the recess 27 to get it vaporized. The electric heating element 2 is electrically connected to the plug 19 in the well known manner.

In all the constructions shown the heat of the electric heating element is well applied and the water and steam have to pass the hottest part of the iron just before it leaves the nozzles 7. A perfect evaporation takes place and no water can possibly remain within the water ways and no rust is produced which might be carried off by the steam and soil the fabric.

In all the constructions described above care is taken that no water or steam can pass on to the heating element 2 and if the valve 5 should leak the water passes off freely through the bores 7.

I wish it well understood that I do not limit my invention to hand operated irons as my invention may be applied to ironing machines as well. Moreover the shape and arrangement of the water container may be made otherwise than as shown and described without departing from the invention.

What I wish to secure by Letters Patent is:

The combination of a flat iron, a cover thereon, an electrical heating element on the flat iron, a backing element on said heating element, a water reservoir forming a handle and having a valved duct arranged to discharge on the iron, the latter being provided with ducts leading to its face, and bolts detachably securing said iron heating element, backing element, cover and reservoir handle together.

In witness whereof I affix my signature.

OTTO WALKER.